(12) United States Patent
Stawiszynski et al.

(10) Patent No.: US 11,228,736 B2
(45) Date of Patent: Jan. 18, 2022

(54) GUARDIAN SYSTEM IN A NETWORK TO IMPROVE SITUATIONAL AWARENESS AT AN INCIDENT

(71) Applicant: MOTOROLA SOLUTIONS, INC, Chicago, IL (US)

(72) Inventors: Maciej Stawiszynski, Cracow (PL); Pawel Jurzak, Cracow (PL); Lukasz Stanslaw Krecioch, Chocznia (PL); Piotr Jan. Kus, Targowiska (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 380 days.

(21) Appl. No.: 16/338,715

(22) PCT Filed: Nov. 7, 2016

(86) PCT No.: PCT/PL2016/050051
§ 371 (c)(1),
(2) Date: Apr. 2, 2019

(87) PCT Pub. No.: WO2018/084725
PCT Pub. Date: May 11, 2018

(65) Prior Publication Data
US 2021/0286980 A1 Sep. 16, 2021

(51) Int. Cl.
*H04N 7/00* (2011.01)
*H04N 7/18* (2006.01)
(Continued)

(52) U.S. Cl.
CPC ......... *H04N 7/181* (2013.01); *G06K 9/00335* (2013.01); *G06K 9/00671* (2013.01);
(Continued)

(58) Field of Classification Search
CPC ........... G06K 9/00335; G06K 9/00771; G06K 9/00671; G06K 9/00791; H04N 5/247;
(Continued)

(56) References Cited

U.S. PATENT DOCUMENTS

| 8,681,232 B2* | 3/2014 | Fan | G06K 9/00 348/211.4 |
| 8,731,961 B2* | 5/2014 | Hanina | G06K 9/00758 705/2 |

(Continued)

FOREIGN PATENT DOCUMENTS

| GB | 2462483 A | 2/2010 |

OTHER PUBLICATIONS

Hypersound HSS300, http://hypersound.com/pro/products/, copyright: 2016, downloaded from internet Feb. 18, 2019, all pages.
(Continued)

*Primary Examiner* — Frank F Huang

(57) ABSTRACT

A process for improving situational awareness at an incident scene includes first receiving audio or video of a user and detecting, in one or both of the audio and video, an instruction directed to another user. A compliance metric associated with the instruction is then accessed and one or more available second cameras having a field of view that incorporates a current location of the another user are identified. One or more video streams from the second cameras are received that include the another user. An action of the another user is identified from the video streams and is correlated with the compliance metric to determine a level of compliance of the another user with the instruction. In response to determining, as a function of the correlating, that the level of compliance falls below a threshold level of compliance, a computing device taking a responsive non-compliance action.

18 Claims, 3 Drawing Sheets

(51) Int. Cl.
*H04N 5/225* (2006.01)
*G06K 9/00* (2006.01)
*G10L 25/57* (2013.01)
*H04N 5/247* (2006.01)
*H04R 1/08* (2006.01)

(52) U.S. Cl.
CPC ..... *G06K 9/00771* (2013.01); *G06K 9/00791* (2013.01); *G10L 25/57* (2013.01); *H04N 5/22525* (2018.08); *H04N 5/247* (2013.01); *H04R 1/08* (2013.01)

(58) Field of Classification Search
CPC ...... H04N 5/22525; H04N 7/181; H04R 1/08; G10L 25/57
See application file for complete search history.

(56) References Cited

U.S. PATENT DOCUMENTS

| | | | | |
|---|---|---|---|---|
| 2002/0140814 A1* | 10/2002 | Cohen-Solal | .......... | G01S 3/785 348/172 |
| 2004/0085203 A1* | 5/2004 | Junqua | .................. | G07B 15/00 340/539.11 |
| 2006/0066732 A1* | 3/2006 | Heymann | .............. | H04N 5/772 348/231.4 |
| 2007/0126873 A1* | 6/2007 | Xu | .................... | G08B 13/1961 348/155 |
| 2008/0037841 A1* | 2/2008 | Ogawa | .............. | H04N 5/23218 382/118 |
| 2009/0059037 A1* | 3/2009 | Naick | .................... | H04N 5/772 348/231.99 |
| 2009/0225173 A1* | 9/2009 | Ogawa | ............... | G06K 9/00362 348/207.99 |
| 2010/0014689 A1* | 1/2010 | Kassayan | ................. | H04R 1/46 381/92 |
| 2013/0088605 A1* | 4/2013 | Quarfordt | .......... | H04L 67/1044 348/207.1 |
| 2014/0313330 A1* | 10/2014 | Carey | ................ | G06K 9/00778 348/143 |
| 2016/0044357 A1* | 2/2016 | Wang | ................ | H04N 21/4334 725/14 |
| 2016/0259342 A1* | 9/2016 | High | .................... | G01C 21/206 |
| 2017/0076572 A1* | 3/2017 | Rao | .......................... | H04N 5/91 |
| 2017/0225336 A1* | 8/2017 | Deyle | ................. | G08B 13/196 |
| 2021/0086370 A1* | 3/2021 | Zhang | ................... | B25J 9/1664 |

OTHER PUBLICATIONS

What is a parmetric speaker?—Soundlazer, http://www.soundlazer.com/what-is-a-parametric-speaker/, Soundlazer copyright 2019, downloaded from internet: Feb. 18, 2019, all pages.

Federal Signal Safety and Security Systems Brochure, One integrated system of total communications, copyright 2014, http://www.federalsignalindust.com/sites/default/files/attachments/SystemsBrochure2014opt.pdf, downloaded from the internet: Feb. 18, 2019, all pages.

The International Search Report and the Written Opinion corresponding patent application serial No. PCT/PL2016/050051 filed Nov. 7, 2016, all pages.

* cited by examiner

GUARDIAN SYSTEM IN A NETWORK TO IMPROVE SITUATIONAL AWARENESS AT AN INCIDENT

This application is a National Stage filing under 35 USC § 371 of co-pending Patent Cooperation Treaty international application having Serial No. PCT/PL2016/050051 (the 'PCT international application') filed on Nov. 7, 2016. This application claims priority to the PCT international application, the entire contents of which are incorporated herein by reference.

BACKGROUND OF THE INVENTION

Tablets, laptops, phones, mobile or portable radios, and other mobile computing devices are now in common use by users, such as first responders, and provide such users with instant access to increasingly valuable additional information such as vehicle histories, arrest records, outstanding warrants, health information, and other information that may aid the user in making a more informed determination of an action to take or how to resolve a situation, among other possibilities. In addition, video coverage of many major metropolitan areas is reaching a point of saturation such that nearly every square foot of some cities is under surveillance by at least one static or moving camera. Currently, some governmental agencies are deploying government-owned cameras or are obtaining legal access to privately owned cameras, or some combination thereof, and are deploying command centers to monitor these cameras. As the number of video feeds increases, however, it becomes difficult to review all of the video feeds being provided in real-time, such that the increased value of such video monitoring and the ability to identify situations of concern decrease substantially. Furthermore, algorithms to electronically review video streams and generally categorize and identify scenes having potential dangerous situations are too compute-power intensive and slow to provide any sort of real-time notification of potential dangerous situations.

Thus, there exists a need for an improved method, device, and system for improving situational awareness for a user by intelligently sub-selecting those video streams associated with a user that has given a command or instruction to another user, and then applying more intensive object and action recognition processing to only those sub-selected video streams following the detected command or instruction for identifying situations in which the another user is non-compliant with the command or instruction given by the user.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
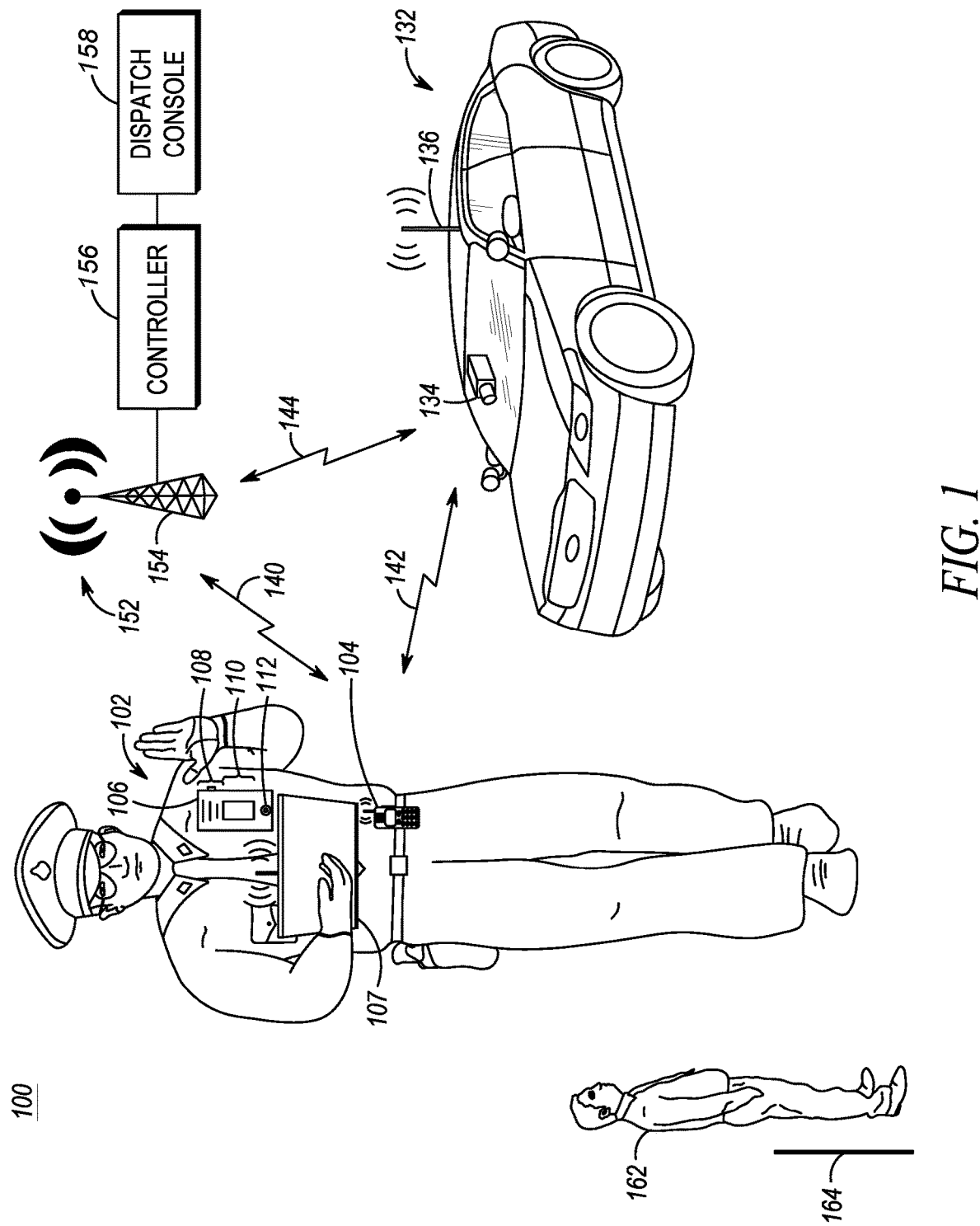
FIG. 1 is a system diagram illustrating improved situational awareness for a user that has been given a command or instruction to another user and for identifying situations in which the another user is non-compliant with the command or instruction given by the user in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method, device, and system for improving situational awareness for a user that has given a command or instruction to another user and for identifying situations in which the another user is non-compliant with the command or instruction given by the user.

In one embodiment a method of improving situational awareness at an incident scene includes: receiving, at a computing device, at least one of audio from the user captured via a microphone located adjacent the user and video of the user captured via a first camera located adjacent the user; detecting, at the computing device and in one or both of the audio and video, an instruction directed to another user; accessing, by the computing device, a compliance metric associated with the instruction; identifying, by the computing device, one or more available second cameras having a field of view that incorporates a current location of the another user; receiving, at the computing device from the identified one or more available second cameras, one or more video streams including the another user; identifying, by the computing device, from the one or more video streams an action taken by the another user; correlating, by the computing device, the identified action with the compliance metric to determine a level of compliance of the another user with the instruction directed to the another user; and responsive to determining, as a function of the correlating, that the level of compliance falls below a threshold level of compliance, the computing device taking a responsive noncompliance action.

In a further embodiment, a computing device comprises a memory storing non-transitory computer-readable instructions, a transceiver, and one or more processors configured to, in response to executing the non-transitory computer-readable instructions, perform a first set of functions comprising: receiving, via the transceiver, at least one of audio from the user captured via a microphone located adjacent the user and video of the user captured via a first camera located adjacent the user; detecting in one or both of the audio and video an instruction directed to another user; accessing a compliance metric associated with the instruction; identifying one or more available second cameras having a field of view that incorporates a current location of the another user; receiving, via the transceiver from the identified one or more available second cameras, one or more video streams including the another user; identifying from the one or more video streams an action taken by the another user; correlating the identified action with the compliance metric to determine a level of compliance of the another user with the instruction directed to the another user; and responsive to determining, as a function of the correlating, that the level of compliance falls below a threshold level of compliance, taking a responsive noncompliance action.

Each of the above-mentioned embodiments will be discussed in more detail below, starting with example communication and device architectures of the system in which the embodiments may be practiced, followed by an illustration of processing steps for achieving an improved method, device, and system for improving situational awareness for a user that has given a command or instruction to another user and for identifying situations in which the another user is non-compliant with the command or instruction given by the user. Further advantages and features consistent with this disclosure will be set forth in the following detailed description, with reference to the figures.

1. COMMUNICATION SYSTEM AND DEVICE STRUCTURES

Referring now to the drawings, and in particular FIG. 1, a communication system diagram illustrates a system 100 of devices including a first set of devices that a user 102 (illustrated in FIG. 1 as a first responder) may wear, including a primary battery-powered portable radio 104 used for narrowband and/or broadband direct-mode or infrastructure communications, a battery-powered radio speaker microphone (RSM) video capture device 106, and/or a tablet device 107 having an integrated video camera and used for data applications such as incident support applications. System 100 may also include a vehicular mobile computing device (not shown) in a vehicle 132 associated with the user 102 and having an associated video camera 134 and vehicular transceiver 136. Each of the portable radio 104, RSM video capture device 106, tablet 107, and vehicular transceiver 136 may be capable of directly wirelessly communicating via a direct-mode wireless link 142, and/or may be capable of wirelessly communicating via a wireless infrastructure radio access network (RAN) 152 over respective wireless links 140, 144.

The portable radio 104 may be any mobile computing device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (e.g., in comparison to a short-range transmitter such as a Bluetooth, Zigbee, or NFC transmitter) with other mobile computing devices and/or the infrastructure RAN. The long-range transmitter may implement a conventional or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE) protocol including multimedia broadcast multicast services (MBMS), an open mobile alliance (OMA) push to talk (PTT) over cellular (OMA-PoC) standard, a voice over IP (VoIP) standard, or a PTT over IP (PoIP) standard. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of long-range wireless protocols could be implemented as well. In the example of FIG. 1, the portable radio 104 may form the hub of communication connectivity for the user 102, through which other accessory devices, such as a biometric sensor, an activity tracker, a weapon status sensor, a heads-up-display, the RSM video capture device 106, and/or the tablet 107 may communicatively couple.

In order to communicate with and exchange audio and other media with the RSM video capture device 106 and/or the tablet 107, the portable radio 104 may contain one or more physical electronic ports (such as a USB port, an Ethernet port, an audio jack, etc.) for direct electronic coupling with the RSM video capture device 106 or tablet 107, and/or may contain a short-range transmitter (e.g., in comparison to the long-range transmitter such as a LMR or Broadband transmitter) and/or transceiver for wirelessly coupling with the RSM video capture device 106 or tablet 107. The short-range transmitter may be a Bluetooth, Zigbee, or NFC transmitter having a transmit range on the order of 0.01-100 meters, or 0.1-10 meters. In other embodiments, the RSM video capture device 106 and/or the tablet 107 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing play back of audio closer to the user's 102 ear, and including a push-to-talk (PTT) switch or other type of PTT input. The voice and/or audio recorded at the remote microphone may be provided to the portable radio 104 for further transmission to other mobile communication devices or the infrastructure RAN or may be directly transmitted by the RSM video capture device 106 to other mobile computing devices or the infrastructure RAN. The voice and/or audio played back at the remote speaker may be received from the portable radio 104 or directly from one or more other mobile computing devices or the infrastructure RAN. The RSM video capture device 106 may include a separate physical PTT switch 108 that functions, in cooperation with the portable radio 104 or on its own, to maintain the portable radio 104 and/or RSM video capture device 106 in a monitor only mode, and which switches the devices to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single mobile computing device to communicate with one or more group members (not shown) associated with a particular group of devices at a same time.

Additional features may be provided at the RSM video capture device 106 as well. For example, a display screen 110 may be provided for displaying images, video, and/or text to the user 102. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data or transmit the captured image data as an image or video stream to the portable radio 104 and/or to other mobile computing devices or to the infrastructure RAN directly.

The tablet 107 may be any wireless computing device used for infrastructure RAN or direct-mode media (e.g., voice, audio, video, etc.) communication via a long-range or short-range wireless transmitter with other mobile computing devices and/or the infrastructure RAN. The tablet includes a display screen for displaying a user interface to an operating system and one or more applications running on the operating system, such as a broadband PTT communications application, a web browser application, a vehicle history database application, an arrest record database application, an outstanding warrant database application, a mapping and/or navigation application, a health information database application, or other types of applications that may require user interaction to operate. The tablet display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the tablet 107, integrating an ability to capture images and/or video of the user 102 and the user's 102 surroundings, and store and/or otherwise process the captured image or video or transmit the captured image or video as an image or video stream to the portable radio 104, other mobile computing devices, and/or the infrastructure RAN.

Each of the mobile radio 104, RSM video capture device 106, and tablet 107 may additionally or alternatively operate as an edge-based audio and/or video processing electronic device consistent with the remainder of this disclosure.

The vehicle 132 may be any type of vehicle associated with the user 102, and may include its own video camera 134 and vehicular transceiver 136. The vehicular transceiver 136 may include a long-range transceiver for directly wirelessly communicating with mobile computing devices such as the portable radio 104, the RSM 106, and the tablet 107, and/or for wirelessly communicating with the RAN 152 via wireless link 144. The vehicular transceiver 136 may further include a short-range wireless transceiver or wired transceiver for communicably coupling with the video camera 134. An additional electronic processor (not shown) may be disposed in the vehicle, in the camera 134, and/or with the transceiver 136 for processing video and/or images produced by the camera 134 and controlling messaging sent and received via the vehicular transceiver 136. A microphone (not shown) may be integrated in the camera 134 or made available at a separate location of the vehicle and communicably coupled to the electronic processor and vehicular transceiver 136. Although vehicle 132 is illustrated in FIG. 1 as providing an example camera and/or microphone for identifying commands or instructions provided by the user/officer 102 to another user 162 and/or for identifying actions taken by the another user 162 in response to the command or instruction, in other embodiments, other types of cameras and/or microphones could be used as well, including but not limited to, video cameras secured to lamp posts, automated teller machine (ATM) video cameras, air or land-based drone-attached video cameras, or other types of audio and/or video recording devices accessible via a wired or wireless network interface same or similar to that disclosed herein.

Infrastructure RAN 152 may implement over wireless links 140, 144 a conventional or trunked LMR standard or protocol such as DMR, a P25 standard defined by the APCO, TETRA, or other LMR radio protocols or standards. In other embodiments, infrastructure RAN 152 may additionally or alternatively implement over wireless links 140, 144 an LTE protocol including MBMS, an OMA-PoC standard, a VoIP standard, or a PoIP standard. In still further embodiments, infrastructure RAN 152 may additionally or alternatively implement over wireless links 140, 144 a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well. The infrastructure RAN 152 is illustrated in FIG. 1 as providing coverage for the mobile radio 104, RSM video capture device 106, tablet 107, and vehicle transceiver 136 via a single fixed terminal 154 coupled to a controller 156 (e.g., radio controller, call controller, PTT server, zone controller, MME, BSC, MSC, site controller, Push-to-Talk controller, or other network device) and including a dispatch console 158 operated by a dispatcher. The controller 156 may additional or alternatively operate as a back-end audio and/or video processing electronic computing device consistent with the remainder of this disclosure.

Figure 2:
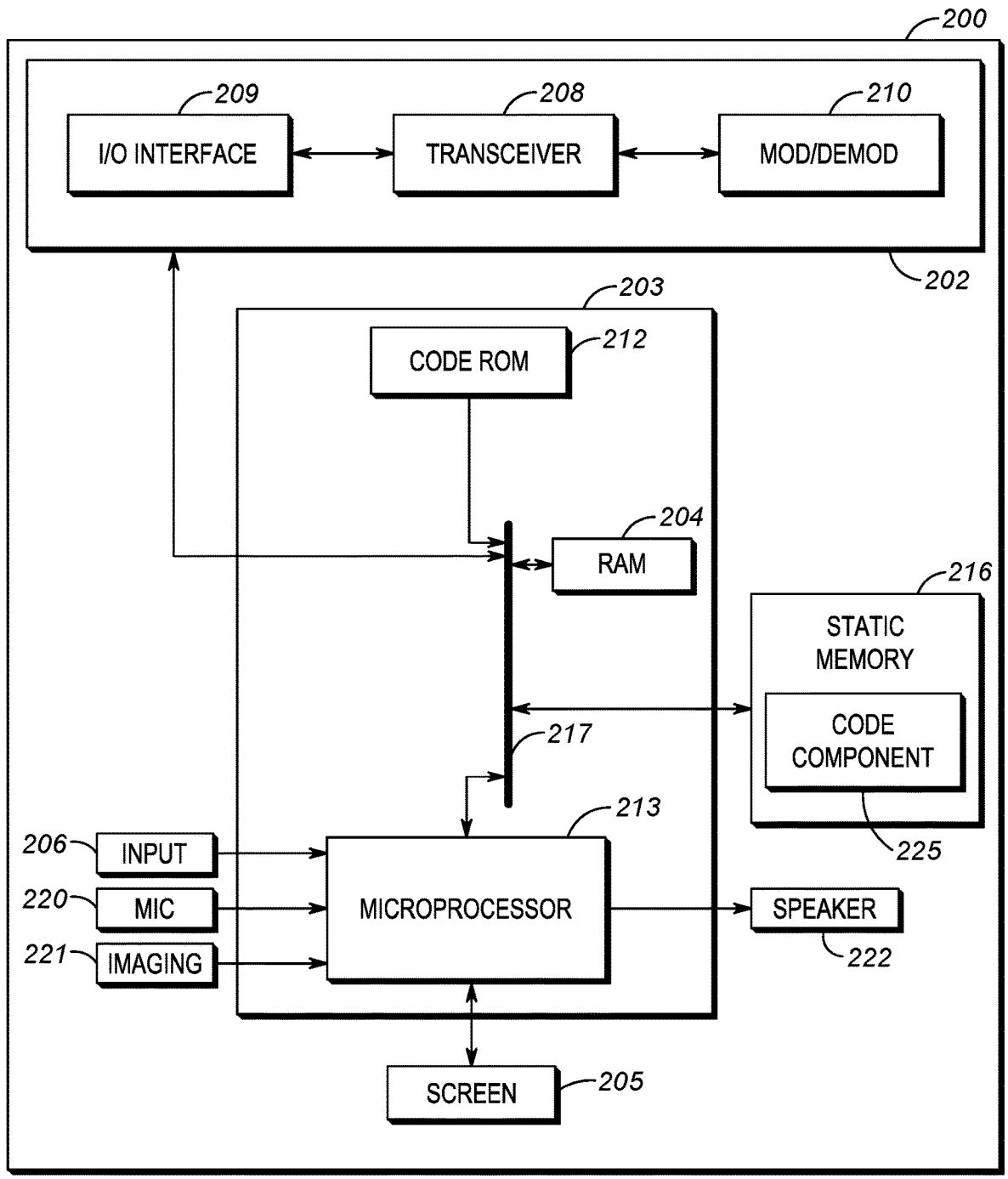
FIG. 2 is a device diagram showing a device structure of a computing device of FIG. 1 in accordance with some embodiments.

Referring to FIG. 2, a schematic diagram illustrates a computing device 200 according to some embodiments of the present disclosure. Computing device 200 may be, for example, the same as or similar to the mobile radio 104, RSM video capture device 106, tablet 107, vehicular electronic processor, or controller 156 of FIG. 1, and/or may be a distributed computing device across two or more of the foregoing and linked via a wired and/or wireless communication link(s). As shown in FIG. 2, computing device 200 includes a communications unit 202 coupled to a common data and address bus 217 of a processing unit 203. The computing device 200 may also include an input unit (e.g., keypad, pointing device, touch-sensitive surface, etc.) 206 and a display screen 205, each coupled to be in communication with the processing unit 203.

A microphone 220 may be present for capturing audio from a user and/or another user that is further processed by processing unit 203 in accordance with the remainder of this disclosure and/or is transmitted as voice stream data by communication unit 202 to other portable radios and/or other devices. An imaging device 221 may provide images and/or video of an area in a field of view of the computing device 200 for further processing by the processing unit 203. A communications speaker 222 may be present for reproducing audio that is decoded from voice streams of voice calls received via the communication unit 202 from other portable radios, from a vehicular transceiver, and/or from an infrastructure RAN device, or may play back alert tones or other types of pre-recorded audio.

The processing unit 203 may include a code Read Only Memory (ROM) 212 coupled to the common data and address bus 217 for storing data for initializing system components. The processing unit 203 may further include a microprocessor 213 coupled, by the common data and address bus 217, to a Random Access Memory (RAM) 204 and a static memory 216.

The communications unit 202 may include one or more wired or wireless input/output (I/O) interfaces 209 that are configurable to communicate with other devices, such as a portable radio, tablet, wireless RAN, and/or vehicular transceiver.

The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or other similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The microprocessor 213 has ports for coupling to the input unit 206 and the microphone unit 220, and to the display screen 205, imaging device 221, and speaker 222. Static memory 216 may store operating code 225 for the microprocessor 213 that, when executed, performs one or more of the computing device steps set forth in FIG. 3 and accompanying text. Static memory 216 may also store, permanently or temporarily, one or more of identifications of types of incidents in which a user may become involved in and, for each type of incident or for all incidents, types of instructions or commands associated with the incident, compliance metrics associated with each instruction or command, and/or types of movements and objects to monitor for in association with the compliance metric, among other possibilities.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

2. PROCESSES FOR OPERATING A COMPUTING DEVICE TO IMPROVE SITUATIONAL AWARENESS

Figure 3:
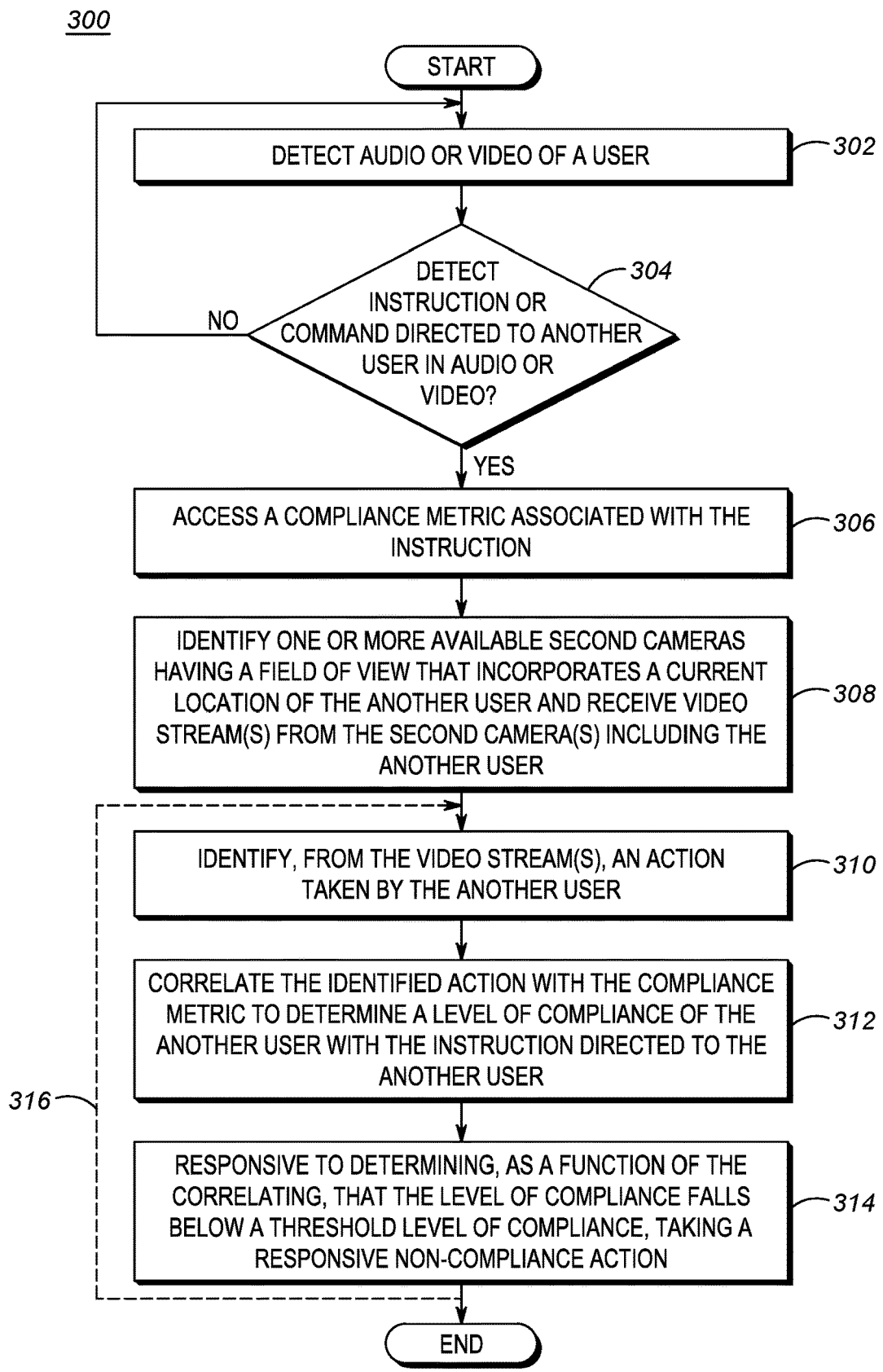
FIG. 3 illustrates a flow chart setting forth process steps for operating the computing device(s) of FIGS. 1 and/or 2 to improve situational awareness in accordance with some embodiments.

Turning now to FIG. 3, a flow chart diagram illustrates a method 300 for improving situational awareness for a user that has given a command or instruction to another user and for identifying situations in which the another user is non-compliant with the command or instruction given by the user. While a particular order of processing steps, message receptions, and/or message transmissions is indicated in FIG. 3 for exemplary purposes, timing and ordering of such steps, receptions, and transmissions may vary where appropriate without negating the purpose and advantages of the examples set forth in detail throughout the remainder of this disclosure. The computing device may execute method 300 at power-on, at some predetermined periodic time period thereafter, in response to a trigger raised locally at the device via an internal process or via an input interface (e.g., the user enabling a particular feature associated with method 300 or the computing device detecting that the computing device and user have exited the vehicle, among other possibilities), or in response to detecting a trigger from the portable radio, vehicle, or infrastructure controller to which it is communicably coupled, among other possibilities.

The computing device executing method 300 may include an edge device same or similar to any one or more of the RSM 106, the laptop 107, or the vehicle camera 134 illustrated in FIG. 1, or may include an infrastructure device same or similar to the controller 156 of FIG. 1. Accordingly, an imaging device generating the audio and/or video at step 302 may also be the device processing the audio and/or video, or the imaging device generating the audio and/or video at step 302 may wirelessly or wiredly transmit the generated audio and/or video to another computing device for further processing. For example, in one embodiment, the laptop 107 computing device of FIG. 1 may perform all steps of FIG. 1, while in other embodiments, the laptop 107 may perform some portion of method 300 (such as steps 302-304, steps 302-306, or 302-312), while another infrastructure controller 156 computing device performs a remaining portion of method 300 (such as steps 306-314, steps 308-314, or step 314). Other combinations are possible as well.

Method 300 begins at step 302 where a computing device detects audio and/or video of a user, such as the user 102 of FIG. 1. The device generating the audio and/or video and providing it to the computing device may be the computing device itself or another device communicably coupled to the computing device, and may include any one or more of a front or rear-facing first camera of an RSM 106, a front or rear-facing first camera of a laptop 107, or a first vehicular camera 134 illustrated in FIG. 1, or may be a fixed first camera coupled to a nearby utility pole, a first camera equipped to a nearby ATM machine, a first camera-equipped drone, or some other first camera available nearby the user and having a field of view that covers the user and is communicatively coupled (wired or wirelessly) to the computing device. In some embodiments, the computing device may already be paired with such first camera(s) via Bluetooth, WiFi, LTE, or other type wireless personal area network (PAN), local area network (LAN), or wide area network (WAN). In other embodiments, the computing device may periodically or on-demand discover the availability of such first cameras via a local direct-mode wireless broadcast of a discovery packet (which may include information regarding the user such as the user's location and/or the computing device's location) and subsequent receipt of a response from nearby available first cameras indicating their availability and a field of view that covers the user (and which in some embodiments may include additional camera imaging parameters such as distance from the user, signal strength of the discovery packet, field of view, pan/tilt/zoom capability, resolution, frame rate, power source, etc.). The computing device may send its own location as a substitute for the user's location, or may send a separately determined location of the user (via some other locationing sensor or communicably received from a portable or mobile radio associated with the user, or other device within the user's personal area network (PAN)). First cameras in receipt of the request may determine their own availability and whether they have a field of view covering the user and/or the computing device using one or more of their own known location, the received location of the user/computing device, a signal strength and direction of arrival of the discovery packet, and/or other parameters.

In other embodiments, the computing device may discover the availability of such first cameras via a request transmitted to a network such as RAN 152 of FIG. 1, after which the infrastructure RAN may process the request by similarly polling available first cameras in a vicinity of the user for their ability to cover a field of view of the user or by accessing a database of known available first cameras and their associated location and field of view (and other imaging parameters). The first cameras reached by the computing device may already be active and recording and already have the user in their field of view, may already be active and recording and may not have the user in their field of view (but may be capable of panning/tilting/zooming to cover the user), or may not currently be active or recording but be capable of transitioning to an active state and covering the user upon a subsequent request by the computing device or infrastructure RAN.

In the case of audio, the computing device at step 302 may access or request access to an audio recording device within a threshold distance, such as 10 or 25 meters of the user or the computing device, and process that raw audio at a later step to detect instructions within the audio. In other embodiments, the computing device itself may access a pre-stored audio profile associated with the user and compare the audio profile to the received audio in order to single out audio generated by, and specific to, the user. In still further embodiments, the computing device may provide or cause another device to provide the audio profile associated with the user and may request only audio recording devices that can positively match the pre-stored audio profile to capture audio and to provide the captured audio back to the computing device. The audio profile may be a voice print, for example, and used in a frequency estimation algorithm, hidden Markov model algorithm, Gaussian mixture model algorithm, pattern matching algorithm, neural network algorithm, matrix representation algorithm, or vector quantization algorithm to identify a speaker in the audio by finding a match between a user voice in the audio and the audio profile. Other possibilities exist as well.

In a similar manner for the case of video of the user, the computing device at step 302 may access or request access to a first camera within a threshold distance, such as 10 or 25 meters of the user or the computing device, and/or that has a field of view of the user or computing device's location and process that raw video at a later step to detect instructions or commands within the video. In other embodiments, the computing device itself may access a pre-stored user image profile associated with the user and compare the user image profile to the received image or video in order to single out video that positively includes the user. The user image profile may include, for example, facial recognition characteristics that could be matched with the user in the captured image or video to ensure that the user is visible and is not blocked by intervening obstacles. In still further embodiments, the computing device may provide or cause another device to provide the user image profile associated with the user and may request only first cameras that can positively match the pre-stored user image profile to capture video and to provide the captured video back to the computing device. Various algorithms may be used to match the user's image in the video to the stored user image profile, including but not limited to geometric hashing, edge detection, scale-invariant feature transform (SIFT), speeded-up robust features (SURF), neural networks, deep learning, genetic, gradient-based and derivative-based matching approaches, Viola-Jones algorithm, template matching, or image segmentation and blob analysis. Other possibilities exist as well.

At step 304, the computing device detects an instruction or command, from the user directed to another user, in the audio or video detected at step 302. In the case of audio, a pre-determined set of instructions or commands may be stored and matched against the audio detected at step 302. For example, commands or instructions such as "stop," "keep moving," "proceed to the exit," "step behind the line," "pull over", and "arms up" may be stored at the computing device and matched against the audio detected at step 302. In some embodiments, stored digital audio recitations of the commands and/or instructions may be matched against the audio detected at step 302, while in other embodiments, audio parameters associated with the command and/or instruction words may be detected in the audio and matched against pre-stored parameters associated with command and/or instructions. Still further, the audio detected at step 302 may be text-converted via a voice-to-text algorithm and matched against text-based commands and/or instructions. Other matching methods are possible too.

In the case of video, a pre-determined set of visual objects may be stored and matched against the video detected at step 302. For example, an image of an outstretched arm with a hand up and palm out may be matched against an image of the user in the video and associated with a stop command, while images of a waving motion with a palm towards the user may be matched against an image of the user in the video and associated with a command to approach the user. Other possibilities exist as well.

In some embodiments, a set of instructions against which to detect by the computing device may be limited based on a context associated with the computing device or the another user, such as an incident or event type in which the user and/or computing device is involved (as set by the computing device or perhaps a dispatch center console that has dispatched the computing device or user associated therewith, such as whether the incident is a robbery, abduction, hostage situation, medical emergency, traffic stop, or some other event), whether the user and/or computing device is a, or associated with, a portable radio or mobile radio (e.g., on-person or in-vehicle), a location or time of day, or some other parameter or parameters.

If no command or instruction is detected at step 304, processing proceeds back to step 302 where an additional portion of captured audio or video of the user is retrieved and subsequently analyzed at step 304 to determine if an instruction or command is detected.

At step 306, the computing device accesses a compliance metric associated with the instruction or command detected at step 304. The compliance metric sets forth, for each corresponding instruction or command, a series of detectable actions (e.g., detectable via audio and/or video processing of the another user) to meet full compliance with the instruction or command. For example, Table I sets forth an example compliance metric for several exemplary instructions:

TABLE I

EXAMPLE COMPLIANCE METRIC

| Instruction: | Detectable Actions: | Compliance Factors: |
|---|---|---|
| "behind the line" or "move to exit" | Direction towards instructed location | Yes: −0% <br> No: −45% |
| | Speed relative to user and/or computing device | 0-0.1 m/s: −30% <br> 0.1-0.5 m/s: −20% |

TABLE I-continued

EXAMPLE COMPLIANCE METRIC

| Instruction: | Detectable Actions: | Compliance Factors: |
|---|---|---|
| | | 0.5-1.5 m/s: −15% |
| | | >1.5 m/s: −0% |
| | Time | 0-10 s: −0% |
| | | 10-20 s: −15% |
| | | 20-30 s: −20% |
| | | >30 s: −25% |
| "pull over" | Direction of vehicle relative to user and/or computing device | Parallel: −0% |
| | | Tangential: −40% |
| | Acceleration of vehicle relative to user and/or computing device | <0 m/s$^2$: −0% |
| | | 0-2 m/s$^2$: −15% |
| | | 2-4 m/s$^2$: −30% |
| | | >4 m/s$^2$: −35% |
| | Time | 0-15 s: −0% |
| | | 15-30 s: −15% |
| | | 30-45 s: −20% |
| | | >45 s: −25% |
| "arms up" | Position of limbs: | Arms up: −0% |
| | | Arms down: −40% |
| | Stillness of user: | Body <0.1 m/s and limbs <0.1 m/s: −0% |
| | | Body 0.1-0.5 m/s, limbs 0.1-0.2 m/s: −15% |
| | | Body >0.5 m/s or limbs >0.2 m/s: −25% |
| | Time | 0-10 s: −0% |
| | | 10-20 s: −15% |
| | | 20-30 s: −25% |
| | | >30 s: −35% |

As set forth above in Table I, various commands or instructions may have associated expected actions or parameters associated therewith, measurable via video processing of video of the another user (perhaps also aided by audio processing of audio of the another user), that may be applied to determine an overall compliance value for the provided command or instruction. Initially, a compliance level for any detected instruction or command may be set to 100%, and the compliance factors from the compliance metric used to decrement the initial value of 100% based on detected actions or parameters associated with the video (and/or audio) of the another user. An overall threshold level of compliance for all instructions or commands may be set to a pre-determined level, such as 40%, 50%, or 70%, below which a noncompliance action may be triggered. In other embodiments, different threshold levels of compliance may be associated with each different instruction or command in the compliance metric, or different threshold levels of compliance may be associated with a particular type of incident in which the instruction or command is detected, among other possibilities. For example, a threshold level of compliance for the "behind the line" command may be set to 65%. The compliance factors may then be used, as a function of expected actions or parameters detected in the video (and/or audio) of the another user, to correspondingly decrease the initial 100% compliance factor until it falls below the associated threshold level of compliance, at which point the computing device takes a responsive noncompliance action.

As a first example, and as set forth above, a detected command of "behind the line," detected at step 304 and for example instructing an another user 162 to move back behind a nearby line 164 on the ground as illustrated in FIG. 1, may have a set of expected actions or parameters associated therewith, including a direction of the another user relative to the location identified in the instruction or command, a speed at which the another user is moving towards the location included in the instruction or command, and a time it is taking the another user to comply with the instruction or command. As set forth in Table I, each of these detectable actions or parameters may have associated compliance factors for determining an overall compliance level with the instruction or command. If the computing device detects, via the video of the another user, that the user is moving towards the instructed location (in this case, behind the line), the initial or current compliance level may not be decreased at all. If, on the other hand, the computing device detects, via the video of the another user, that the another user is moving away from the instructed location (in this case, further away from the line), the initial or current compliance level may be reduced by the amount indicated in the compliance metric (e.g., 45% as set forth in Table I).

Further, the computing device may extract from the video of the another user a speed with which the another user is moving as an indication of compliance with the instruction or command. If the computing device detects, via the video of the another user, that the user is not moving at all or is moving at a speed under 0.1 m/s, the initial or current compliance level may be decreased by 30%. If, on the other hand, the computing device detects, via the video of the another user, that the another user is moving at a speed of 0.1-0.5 m/s, the initial or current compliance level may be reduced by a lesser amount of 20%. Other detected speeds may result in other deductions (or lack thereof) as set forth in Table I.

Still further, the computing device may extract from the video of the another user a time for the another user to comply with the instruction, and may use a time parameter as a compliance factor to reduce the initial or current compliance level as time passes without a determination that the user has fully complied with the instruction or command or, in other embodiments, has at least started execution of a threshold number (one or more) of the actions indicated in the compliance metric for that instruction or command. In some examples, multiple time-based thresholds may be implemented for timing initial actions towards executing at least the threshold number (one or more) of the actions indicated in the compliance metric for that instruction or command and for timing full compliance with the instruction or command, with corresponding decrements to the initial or current compliance level.

If the computing device detects, via the video of the another user, that 0-10 s has passed since the command or instruction was given, the initial or current compliance level may not be decreased at all. If, however, the computing device detects that more than 10 s has passed since the command or instruction was given, the initial or current compliance level may be reduced by 15%. Additional passages of time without detected compliance with the instruction or command (e.g., the another user has moved behind the line) may result in further additional reductions in the current compliance level as indicated in Table I. Of course, other time period thresholds could be used in other examples, and may be caused to vary based on the type of instruction or command.

As a second example, and as set forth above, a detected command of "pull over," detected at step 304 and for example instructing an another user 162 driving an associated vehicle to pull over, may have a set of expected actions or parameters associated therewith, including a direction of the vehicle/another user relative to the user (or the user's mobile or portable radio, etc.), an acceleration of the another vehicle relative to the user (or the user's mobile or portable radio, etc.), and a time it is taking the another user/vehicle to comply with the instruction or command. As set forth in Table I, each of these detectable actions or parameters may have associated compliance factors for determining an overall compliance level with the instruction or command. If the computing device detects, via the video of the vehicle/another user, that the vehicle/another user is moving in a generally (e.g., plus or minus 30 degrees) parallel direction to the user, the initial or current compliance level may not be decreased at all. If, on the other hand, the computing device detects that the vehicle/another user is moving in a generally perpendicular direction to the user (e.g., plus or minus 30 degrees), the initial or current compliance level may be decreased by 40%.

Further, the computing device may extract from the video of the vehicle/another user an acceleration with which the another user is moving relative to the user (or the user's mobile or portable radio, etc.) as an indication of compliance with the instruction or command. If the computing device detects, via the video of the another user, that the vehicle/another user is de-accelerating (e.g, an acceleration less than 0) relative to the user, the initial or current compliance level may be decreased by 30%. If, on the other hand, the computing device detects that the vehicle/another user is accelerating from 0-2 $m/s^2$ relative to the user, the initial or current compliance level may be reduced by 15%. Other detected accelerations may result in other deductions (or lack thereof) as set forth in Table I. In some embodiments, acceleration and direction of vehicle may be tied together in a single applied compliance factor, such that only a perpendicular direction tied to certain relative positive acceleration levels trigger a decrease in compliance (e.g., indicating the vehicle is likely attempting evasive maneuvers).

Still further, the computing device may extract from the video of the another user a time for the another user to comply with the command or instruction, and may use a time parameter as a compliance factor to reduce the initial or current compliance level as time passes without a determination that the user has fully complied with the initial or current compliance level. If the computing device detects, via the video of the vehicle/another user, that 0-15 s has passed since the command or instruction was given and the vehicle has not pulled over to the side of the road and reached a zero speed (e.g., is parked), the initial or current compliance level may not be decreased at all. If, however, the computing device detects that more than 15 s has passed since the command or instruction was given, the initial or current compliance level may be reduced by 15%. Additional passages of time without detected compliance with the instruction or command (e.g., the vehicle/another user has pulled over and stopped) may result in further additional reductions in the current compliance level as indicated in Table I.

As a third example, and as set forth above, a detected command of "arms up," detected at step 304 and for example instructing an another user to stop and raise his or her arms, may have a set of expected actions or parameters associated therewith, including a position of the arms/limbs of the another, a stillness of the another user, and a time it is taking to comply with the instruction or command. As set forth in Table I, each of these detectable actions or parameters may have associated compliance factors for determining an overall compliance level with the instruction or command. If the computing device detects, via the video of the another user, that the another user has raised his or her arms up into the air (e.g., plus or minus 30 degrees), the initial or current compliance level may not be decreased at all. If, on the other hand, the computing device detects that the another user has not raised his or her arms into the air (e.g., plus or minus 20 degrees), the initial or current compliance level may be decreased by 40%.

Further, the computing device may extract from the video of the another user a stillness of the user, perhaps measured by an instantaneous speed of the user as a whole (e.g., measured at a center of mass of the another user) and/or an average speed/movement of the user's limbs over a short period of time (e.g., ~1-5 s). If the computing device detects, via the video of the another user, that the another user is moving (or his or her limbs are moving) at a relatively low speed under 0.1 m/s, the initial or current compliance level may not be decreased at all. If, on the other hand, the computing device detects that the another user is moving (or his or her limbs are moving at an average speed over a period of time) greater than 0.1 m/s, the initial or current compliance level may be reduced by 15%. Other detected speeds may result in other deductions as set forth in Table I.

Still further, the computing device may extract from the video of the another user a time for the another user to comply with the instruction, and may use a time parameter as a compliance factor to reduce the initial or current compliance level as time passes without a determination that the user has fully complied with the initial or current compliance level. If the computing device detects, via the video of the vehicle/another user, that 0-10 s has passed since the command or instruction was given and the another user has not raised his or her arms and remained relatively still (as measured by the lowest stillness factor set forth above), the initial or current compliance level may not be decreased at all. If, however, the computing device detects that more than 10 s has passed since the command or instruction was given, the initial or current compliance level may be reduced by 15%. Additional passages of time without detected compliance with the instruction or command (e.g., the another user has not raised his or her hands and remained relatively still) may result in further additional reductions in the current compliance level as indicated in Table I.

Although Table I sets forth an example compliance metric in a table-like fashion, other ways of organizing the elements of Table I may be implemented in various manners, including but not limited to a list of comma separated values, XML, and a relational database.

At step 308, the computing device identifies one or more available second cameras having a field of view that incorporates a current location of the another user and receives a video stream or streams from the second camera(s) including the another user. The second camera or cameras may be same or similar to the first camera(s) providing the audio and/or video in which an instruction is detected at step 304, or may be separate and distinct from the first camera(s). In some embodiments, image and/or video streams of the another user may already have been started recording and may or may not already have started being provided to the computing device. However, prior to the detection of the instruction or command at step 304, the computing device may not have applied any video or image processing to identify actions of the another user and/or determine a compliance level of the another user consistent with steps 310-312. Only after detecting the instruction or command at step 304 does the computing device intelligently sub-select those video or image streams associated with the user that has given the detected command or instruction to the another user, and then apply object and action recognition processing to those sub-selected video or image streams following the detected command or instruction for determining a compliance level and taking further actions as noted in step 314 below.

Returning to step 308, and assuming a video or image stream of the another user is not already being provided to the computing device, the computing device may identify the one or more available second cameras to do so in a number of ways. In a first embodiment, the computing device may be directly wiredly connected to the one or more available second cameras. For example, the computing device may be the laptop 107 of FIG. 1 and the second camera an integrated camera in the laptop 107. In other embodiments, the computing device may be the portable radio 104 and the second camera an integrated camera 112 of an RSM 106 wiredly coupled to the portable radio 104. Additionally or alternatively, the computing device may discover available nearby second cameras via an ad-hoc wireless network by, for example, transmitting a wireless beacon containing information regarding the field of view needed, characteristics of the another user, location information of the user, the another user, and/or computing device, and/or other information, and may then monitor for responses from second cameras meeting the requested specifications. Still further, the computing device may have access to locally or remotely, or may transmit a request for information from, a database of second camera locations that sets forth one or more of second camera locations, camera imaging parameters (resolution, light sensitivity, light range, focal distances, etc.), fields of view, availability, and camera security access parameters. The database may be pre-populated manually, or may be dynamically created and/or updated as additional second cameras are added to the system and report their availability and one or more other parameters noted above.

When identifying the one or more available second cameras having a field of view that incorporates the another user, the computing device may use known location information of the computing device itself (e.g., as a proxy for a location of the another user) or known location information of a portable radio or mobile radio associated with the command or instruction-giving user (e.g., on-person or in-vehicle). In some embodiments, the computing device may use orientation information of the command-giving user and an additional depth camera to estimate a location of the another user relative to the computing device, portable radio, or mobile radio. Still other mechanisms could be used to ensure that second cameras identified at step 308 most likely have a field of view incorporating the another user.

In embodiments in which second cameras are identified that have a pan, tilt, zoom capability (PTZ), they may be controlled to adjust their field of view to incorporate a location of the user and/or the another user. Further, they may be controlled separately to maintain the another user in their field of view as the another user moves about.

If more than one second camera is identified at step 308 as having a field of view incorporating the current location of the another user, the computing device may select all of the identified second cameras for use in subsequent steps, or may use parameter information provided by the second cameras or accessed via a local or remote database to select a second camera having a best desired parameter fitting a current context of the incident or event (e.g., supporting visible and infrared or having a highest light sensitivity if at night, a highest resolution during the day or if the scene is otherwise lighted, having a largest field of view, or a combination of one or more of the foregoing, etc.). Once one or more second cameras are identified at step 308, and if not already being provided to the computing device, the computing device requests the selected one or more second cameras to begin providing a video stream and/or periodic image captures to the computing device for further processing relative to the instruction detected at step 304. The request may involve a simple message requesting streaming to begin, or may involve a handshake process in which each second camera authenticates or otherwise authorizes the computing device to receive the stream(s), which may involve one or more third party or responder agency-owned authentication services. In situations where the one or more second cameras are in a power-saving or inactive mode, the request may inherently or explicitly include a request to exit the power-saving or inactive mode and enter a power-on mode and begin capturing images and/or video of the another user.

For those second cameras already providing a video and/or image stream to the computing device, the computing device may transition from not processing the received video stream and/or images relative to the command or instruction for actions associated therewith, to actively processing the received video stream and/or images relative to the command or instruction for actions associated therewith, effectively sub-sampling the received video or image stream based on the detected command or instruction.

At step 310, the computing device receives the one or more video or image streams from the one or more second cameras selected at step 308 and identifies, from the one or more video or image streams, an action taken by the another user. The another user may be identified in the one or more video or image streams in any number of ways. For example, the another user may be identified as one taking at least one or more actions from a set of detectable actions associated with the instruction or command (as described in more detail below). In other examples, the another user may be identified by a process of elimination in which a user, first responder, or officer having a known uniform or other clothing or unique feature detectable via the image or video is eliminated from selection as the another user. Still further, uniquely identifiable information included in the audio from which an instruction or command was detected at step 304 may be provided to the computing device to aid in identifying the another user, such as "you with the red cap, move behind the line," may be used to select the another user as the one detected in the image or video as wearing a red cap. In another embodiment, a detected head direction or eye-gaze direction of the command-giving user detected via image processing or some other command-giving user-attached mechanical, electronic, or magnetic device means (such as a compass or electronic eyeglasses/eyewear) and provided to the computing device may be used to identify the another user as the one in the direction in which the command-giving user's head is pointed. In an example where the instruction or command was detected in audio at step 304, the another user may be detected via a determination of a directionality of the command or instruction detected at step 304, detected via spaced microphones or microphone arrays placed at the computing device, at one or more second cameras, on the command-giving user, or at other locations and directionality information provided to the computing device to aid in identifying the another user as one in the direction at which the command was transmitted by the command-giving user. In an example where the instruction or command was detected as a gesture in video only at step 304, the another user may be detected via a determination of a directionality of the gesture provided by the command-giving user (e.g., an out-stretch hand with an open palm in a "stop" instruction gesture directed at one particular another user). Other possibilities exist as well.

A set of detectable actions of the another user for matching against the received one or more video or image streams may be stored at the computing device or a remote computing device and made accessible to the computing device via a communications network. The set of detectable actions may be a set of all detectable actions, such as for example all those actions set forth in Table I above, or may be limited to a particular context associated with an incident or event in which the computing device is involved (as set by the computing device or a dispatch center console), may be limited to particular environmental factors detected at the computing device, may be limited based on whether the computing device is, or is associated with, a portable radio or mobile radio (e.g., on-person or in-vehicle), or may be limited based on a location or time of day, among other factors. In some embodiments, the compliance metric as set forth in Table I may be used to sub-select actions for identification at step 310 based on the instruction or command detected at step 304. In still further examples, both context and compliance metric information may be used to sub-select actions for detection.

Various algorithms may be used to match actions in the one or more image or video streams received at step 310 with a detectable action, including but not limited to geometric hashing, edge detection, scale-invariant feature transform (SIFT), speeded-up robust features (SURF), neural networks, deep learning, genetic, gradient-based and derivative-based matching approaches, Viola-Jones algorithm, template matching, or image segmentation and blob analysis. Other possibilities exist as well.

At step 312, the computing device correlates the action of the another user identified at step 310 with the compliance metric accessed at step 306 and determines a level of compliance of the another user with the instruction or command directed to the another user and detected at step 304. For example, the computing device may initially set a 100% compliance rate (e.g., set a value of 100 or 1 as a numerical representation of a full compliance level) associated with the detected command, and then use detected actions or a lack of detected actions, as a function of actions identified at step 310 relative to actions retrieved from the compliance metrics, to retain the compliance level at its current state or begin lowering the compliance level. For example, and referencing the example compliance metrics set forth in Table I above, if the command detected at step 304 is "move to exit," the computing device may access the compliance metrics and retrieve actions associated with direction, speed, and time as set forth in Table I for identifying in the received images or video stream(s) at step 310. At step 312, the computing device may then identify the another user in one of the manners set forth above, and may specifically detect that the another user is moving away from the exit identified in the command. Accordingly, and as a result, the current compliance level of 100% or 1 may be reduced in accordance with the compliance metrics to 55% or 0.55. As another separate example, the computing device may identify the another user and detect that the another user is moving towards the instructed exit location, but is moving slowly (e.g., at ~0.25 m/s) and is taking a long time to get there (e.g., still not there 25 s later). Accordingly, the computing device may lower the initial compliance level of 100% or 1 to 60% or 0.60 (20% due to the speed and initially 15% and then 20%, total, due to time passing past 10 s and then past 20 s, respectively).

In other embodiments, the initial compliance level may be set to 0, and the compliance factors set to positive factors such that, for example, the initial compliance level of 0% or 0 is increased once the another user is detected to be moving towards the exit in response to a detected "move to the exit" command. Other valuations and processes for setting initial compliance levels and adjusting the compliance levels over time as a function of detected actions and compliance metrics could be implemented as well. In this manner, one or more subsequent threshold comparisons may be delayed some time after the instruction or command is detected at step 304, such as 10, 25, or 35 s thereafter, in order to allow the compliance level to find some sort of stable value before performing any threshold comparisons.

At step 314, the computing device determines if the compliance level adjusted (or not) at step 312 as a function of the identified action of the another user has fallen below a threshold level of compliance, and responsive to a determination that it has, takes a non-compliance action. The responsive non-compliance action could include a notification action, a dispatch action, an emergency alert action, a video-tagging action, a user-tagging action, or some other type of computing device non-compliance action.

Particular computing device non-compliance actions associated with particular commands or instructions may be stored in the compliance metric itself, or may be stored in a separate non-compliance action table, database, or store and linked to the corresponding action in the compliance metric in some manner. Furthermore, different computing device non-compliance actions may be associated with different levels of compliance, such that as the compliance level drops (or rises, depending on the referenced starting point), different escalating computing device non-compliance actions may be taken. For example, a first threshold compliance level set in the range of 55-75% may, when passed, cause a first non-compliance action such as notification to issue (assuming an initial 100% compliance level) to a portable or mobile radio device associated with the command-giving user or a dispatcher at a dispatch console, while a second threshold compliance level set in the range of 40%-55% may, when passed, cause a second non-compliance action such as an automatic dispatch request (via ad-hoc transmission or infrastructure-supported transmission) to nearby first responders to aid the command-giving user with the non-compliant another user. In other embodiments, a single non-compliance threshold in the range of 30-55%, such as 50%, may be applied to trigger a single computing device non-compliance action across all instruction and command types.

In the case of a notification computing device non-compliance action, the notification may include generating and displaying a notification window with alphanumerical notification text in an electronic user interface of the computing device or some other computing or communications device alerting a user thereof (perhaps the command-giving user or a dispatcher) to the non-compliance of the another user with the instruction or command. For example, the notification window may alert the user to the non-compliance, include a text description of the instruction or command given, what actions were detected that reduced the compliance level, and a numerical representation of the current compliance level.

In some embodiments, the notification window may also include an identification of the particular second camera(s) that captured the video or image stream(s) in which the action or actions reducing the compliance level below the threshold were detected, and may include a link or button that allows a user receiving the notification to bring up a live video stream for that particular second camera. In some embodiments, the notice may further include physical characteristics of the particular other user extracted from the video or image stream, such as a color of clothing, hat, or skin, markings or logos present on clothing or skin, types of shoes, or other distinguishing characteristics to help the person ultimately receiving the notice to identify the particular other user.

In response to receiving the notification, the user thereof can further monitor the another user more closely and, if necessary, dispatch additional aid in the form of additional first responders to the location of the command-giving user and/or another user.

In another example, and instead of a notification window, a video or image stream window may be caused to be automatically and immediately raised by the computing device, at a mobile or portable radio associated with the command-giving user or at a dispatch console associated with the dispatcher that provides a live video stream for that particular second camera noted above. The live video stream may be modified by the computing device or the receiving device to highlight or outline the another user so that the another user can be more quickly identified and monitored. In addition, an alert tone and/or flashing visual light may be caused to be played back at the computing device, at the portable or mobile radio associated with the command-giving user, at the dispatch console, or at a device of the user receiving the video or image stream to further indicate that a level of compliance below a threshold level has been detected.

In a still further embodiment, the computing device non-compliance action may include tagging the video at the time that each compliance-level decreasing action is detected, and/or at each time a particular threshold level is breached, among other possibilities. Additionally or alternatively, the another user whose actions were detected to be non-compliant with the command may be tagged with metadata associated with the another user, such as a name, location, or ID, and/or with information identifying the command or instruction given by the user, among other possibilities. This video can then be stored and saved for later use in other proceedings, such as court proceedings.

In some embodiments in which a plurality of second cameras were identified in step 308 and each of the plurality of second cameras generate video or image streams that are processed by the computing device at step 310 to identify actions of the another user, the multiple such image or video streams may be made available to the command-giving user at his or her mobile or portable radio, at the dispatch console, or at some other device.

In some embodiments, the prominence of the displayed notification and/or video stream window may be caused to vary based on the underlying command or instruction identified or on an incident type set at the computing device or received at the computing device from another device, such as a dispatch console. For example, if the instruction or command detected at step 304 is identified in the compliance metric or elsewhere as a high priority command such as "put down the weapon", the displayed notification window and/or video stream may be caused to be displayed at the user interface at the receiving device in a more prominent fashion, for example at a larger or largest possible screen size, at a center-most area of the screen, and/or accompanied by an audio tone or flashing visual light. If, on the other hand, the instruction or command detected at step 304 is identified in the compliance metrics or elsewhere as a lower priority command such as "move behind the line" or "stop moving," the displayed notification window and/or video stream may be caused to be displayed at the user interface of the receiving device in a less prominent fashion, for example at a smaller or smallest possible screen size, at a corner area of the screen, and/or not accompanying any additional audio tone or flashing colors or borders. In some embodiments, the computing device may instruct the receiving device regarding the underlying priority of the command, while in other embodiments, the computing device may identify the command to the receiving device and rely on the receiving device to independently determine a priority of the notification or video stream associated with the command.

In a still further embodiment, the responsive non-compliance action taken by the computing device at step 314 may include, additionally or alternatively, causing a dispatch request to be transmitted to one of another nearby user, such as another nearby officer or first responder, or to a dispatcher in the infrastructure RAN. The transmitted dispatch request may include location information (of the command-giving user and/or the another user), command identification information, action identification information, compliance level identification information, and/or similar links to the video or image streams as set forth above. In this manner, additional support can be provided to the command-giving user to ensure that non-compliant another users are handled safely and efficiently, and that command-giving users such as police officers and paramedics are kept out of harm's way.

After step 314, the process 300 may end, or may return to step 310 along optional path 316, at which time additional video and/or images provided by the identified one or more second cameras are reviewed for further actions taken (or not taken) by the another user and similarly analyzed for compliance or non-compliance as already set forth above.

3. CONCLUSION

In accordance with the foregoing, an improved method, device, and system for improving situational awareness for a user that has given a command or instruction to another user and for identifying situations in which the another user is non-compliant with the command or instruction given by the user is disclosed. As a result of the foregoing, the command-giving user's situational awareness and a safety of the command-giving user may be improved and additional automatic notifications provided to the command-giving user or others, and automatic dispatch of supporting personnel provided in those situations where processing of videos or images of the another user justify a level of non-compliance with a detected command or instruction directed at the another user.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of improving situational awareness at an incident scene, the method comprising:
   receiving, at a computing device, at least one of audio from a user captured via a microphone located adjacent the user and video of the user captured via a first camera located adjacent the user;
   detecting, at the computing device and in one or both of the audio and video, an instruction directed to another user, wherein the instruction directed to the another user is to pull a vehicle over to a shoulder of a road;
   accessing, by the computing device, a compliance metric associated with the instruction, wherein the compliance metric includes varying levels of compliance based on a direction of a vehicle associated with the another user, a speed or acceleration of the vehicle associated with the another user, and a passage of time to comply with the instruction;
   identifying, by the computing device, one or more available second cameras having a field of view that incorporates a current location of the another user;
   receiving, at the computing device from the identified one or more available second cameras, one or more video streams including the another user;
   identifying, by the computing device, from the one or more video streams an action taken by the another user;

correlating, by the computing device, the identified action with the compliance metric to determine a level of compliance of the another user with the instruction directed to the another user; and responsive to determining, as a function of the correlating, that the level of compliance falls below a threshold level of compliance, the computing device taking a responsive noncompliance action.

2. The method of claim 1, wherein the responsive noncompliance action is causing a mobile device associated with the user to display a notice to the user via a user interface.

3. The method of claim 1, wherein the responsive noncompliance action is tagging the video stream to indicate non-compliance prior to storing the video stream for future reference and retrieval.

4. The method of claim 1, wherein the responsive noncompliance action is causing, by the computing device, a dispatch console at a command and control center to display a notice via a user interface.

5. The method of claim 4, wherein the notice includes a video stream or a link to retrieve and display the video stream and wherein a portion of the displayed video stream is modified to emphasize the identified action in the video stream.

6. The method of claim 1, wherein the identified one or more available second cameras includes one or both of a body camera of the user and a vehicular camera associated with the user.

7. The method of claim 1, wherein identifying the one more available second cameras includes receiving a location of one of the user and the another user and identifying a static public safety camera within a threshold distance of the user or identifying and dispatching a robotic drone camera to the location of the user.

8. The method of claim 1, wherein the method further comprises:
determining, by the computing device, a context of the user or the another user; and
using the context of the user to limit a number of instructions against which to monitor the audio for.

9. The method of claim 8, wherein identifying from the video stream an action taken by the another user comprises using both the compliance metric and the context of the user to sub-select corresponding actions to identify from the video stream for correlating.

10. The method of claim 8, wherein determining, by the computing device, the context of the user comprises determining a type of incident as a function of information received from the user via a user interface at a mobile computing device associated with the user.

11. The method of claim 1, wherein identifying from the video stream an action taken by the another user comprises using, by the computing device, the compliance metric to sub-select corresponding actions to identify from the video stream for correlating.

12. The method of claim 1, wherein the one or more available second cameras are inactive, the method further comprising transmitting, by the computing device, an instruction to the one or more available second cameras to transition to an active recording state.

13. The method of claim 1, wherein the threshold level of compliance is 50%.

14. The method of claim 1, wherein the instruction directed to the another user is to move to a particular location and the compliance metric includes varying levels of compliance based on direction of the another user relative to the indicated location, a speed of the another user, and a passage of time to comply with the instruction.

15. The method of claim 1, wherein the step of identifying the action taken by the another user further comprises identifying the another user in the video stream via one or more of (i) additional uniquely identifiable information included in the audio, (ii) a gesture of the user towards the another user, (iii) a head direction of the user relative to the another user, and (iv) a directionality of audio from the user to the another user.

16. The method of claim 1, wherein identifying the level of compliance further comprises extracting audio of the another user from the video stream and identifying indications of compliance or non-compliance from the extracted audio.

17. The method of claim 1, further comprising applying a voice recognition algorithm to uniquely identify the audio from the user and to further distinguish secondary audio from the another user.

18. A computing device comprising:
a memory storing non-transitory computer-readable instructions;
a transceiver; and
one or more processors configured to, in response to executing the non-transitory computer-readable instructions, perform a first set of functions comprising:
receiving, via the transceiver, at least one of audio from a user captured via a microphone located adjacent the user and video of the user captured via a first camera located adjacent the user;
detecting in one or both of the audio and video an instruction directed to another user, wherein the instruction directed to the another user is for the another user to assume a particular body position;
accessing a compliance metric associated with the instruction, wherein the compliance metric includes varying levels of compliance based on positions of limbs of the another user, a stillness of the another user, and a passage of time to comply with the instruction;
identifying one or more available second cameras having a field of view that incorporates a current location of the another user;
receiving, via the transceiver from the identified one or more available second cameras, one or more video streams including the another user;
identifying from the one or more video streams an action taken by the another user;
correlating the identified action with the compliance metric to determine a level of compliance of the another user with the instruction directed to the another user; and
responsive to determining, as a function of the correlating, that the level of compliance falls below a threshold level of compliance, taking a responsive noncompliance action.

* * * * *